Figure 1:
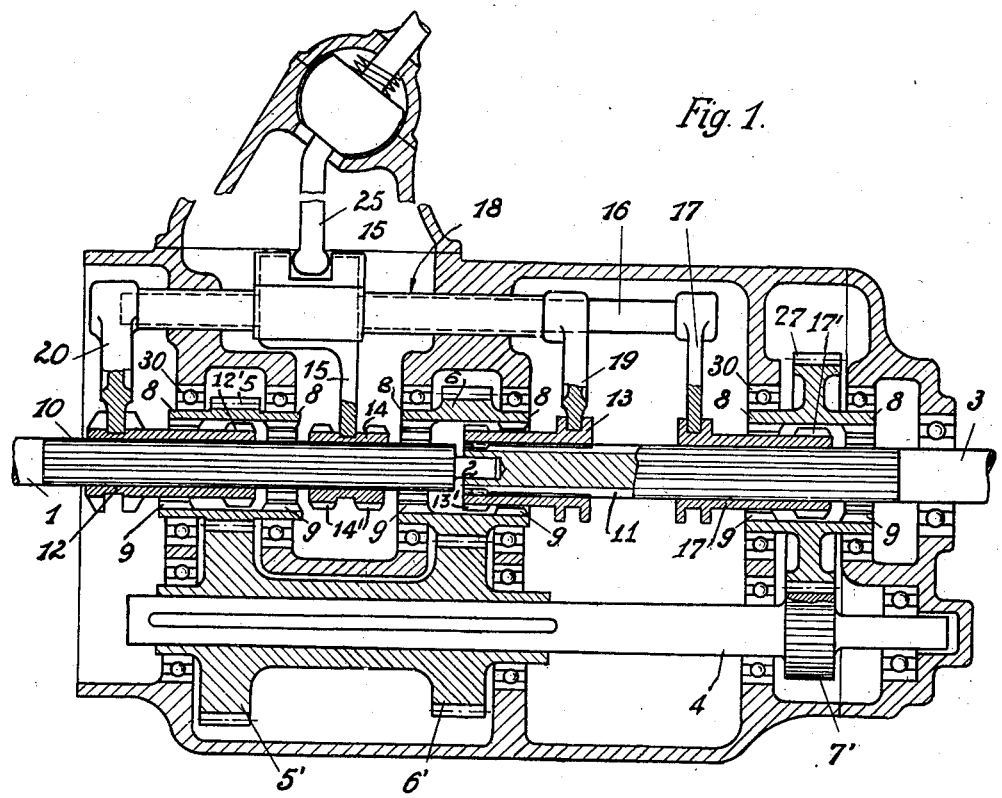

April 5, 1932.  A. MAIER  1,852,247

GEAR

Filed Feb. 25, 1930

Inventor:
Albert Maier

Patented Apr. 5, 1932

1,852,247

UNITED STATES PATENT OFFICE

ALBERT MAIER, OF FRIEDRICHSHAFEN, GERMANY, ASSIGNOR TO ZAHNRADFABRIK AKTIENGESELLSCHAFT, OF FRIEDRICHSHAFEN, BODENSEE, GERMANY

GEAR

Application filed February 25, 1930, Serial No. 431,146, and in Germany April 6, 1929.

My invention relates to gears and has special reference to change speed gears with constantly meshing gear wheels.

The main object of my invention is to attain an extremely compact construction and thereby an exceptionally short gear box. It has nothing to do with the number of speeds for which the change speed gear in which my invention is made use of may be intended for. But the more speed changes there are the greater is the advantage attainable through my invention.

There are many other advantages connected with my invention which will easily be found out in the following descriptions of the examples embodying my invention which are represented in the drawings.

Figure 2:
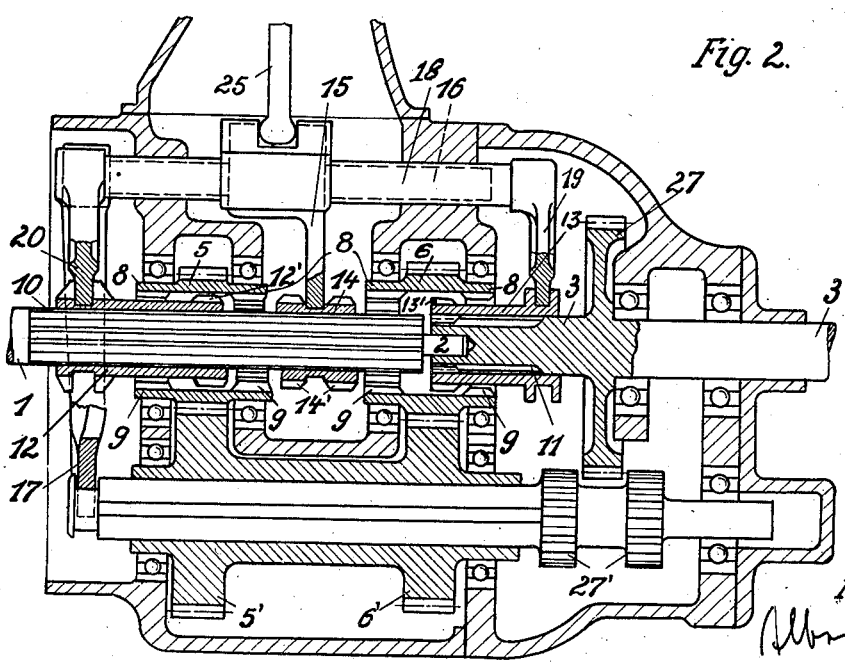

Fig. 1 is a longitudinal vertical section through a change speed gear for four speeds in which all speed changes are perfected by means of my invention; whereas in the example shown in Fig. 2, which is also a longitudinal vertical section through a change speed gear, the construction according to my invention is used only for some of the speed changes, the other changes in speed being made by shifting wheels, or better by shifting the stub shaft. Otherwise the two constructions are perfectly alike.

In both cases the incoming or driving shaft is designated by the numeral 1. The end of shaft 1 is journaled at 2 in a recess of the end of the outcoming or driven shaft 3. Both shafts are substantially in alignment with each other. In the example shown in Fig. 1 there are three gears 5, 6 and 7 constantly meshing with gears 5', 6' and 7', respectively. The latter gears are in fixed connection with stub shaft 4, whereas the first mentioned gears are adapted to be coupled or decoupled with shaft 1 or shaft 3, respectively. For this purpose these gears 5, 6 and 7, according to my invention, are not splined to their respective shafts but are journaled on their outer circumference for instance in ball bearings 30. In the present example there are two ball bearings for each of the gears. The hub 8 of these gears has a wide bore and there are teeth or other projections 9 provided inwardly of the hollow hub. There are intermediate members 12, 14, 13 and 17 splined to shafts 1 and 3, respectively which are provided with outwardly projecting teeth 12', 14', 13' and 17', being so shaped that on adequate shifting of these intermediate members their teeth fit into the gaps between the inwardly projecting teeth 9 of the hubs 18 of gears 5, 6 or 7. Thus it is possible to cause connection between shaft 1 and one of the gears 5 or 6 and also between shaft 3 and one of the gears 6 or 7. It may easily be seen from Fig. 1 that in this way striker rods 16 and 18 by means of forked arms 20, 15, 19 and 21, and operated in the usual way by lever 25 are adapted to cause the necessary connections between the two shafts 1 and 3, respectively, and the gears 5, 6 and 7 for the purpose of attaining the speed desired in any and every case.

I prefer to provide the inwardly extending teeth 9 in the hubs of the gears only at the two ends of the hollow hub, so that in the middle portion of the hub there are no teeth. Thus it becomes possible to disengage the teeth of the intermediate members 12, 14, 13 and 17 not only by shifting them away from the corresponding gears but also by shifting them so that their teeth come into a position intermediate the two rows of teeth of the gears. This feature again increases the main advantage of my invention, that is the extraordinary shortness in the construction of the entire gearing and its box.

In the example represented in Fig. 2 gear 27 corresponding to gear 7 in Fig. 1 is rigidly fixed to driven shaft 3. There is no gear on stub shaft 4 which constantly meshes with gear 27, but there are two gear rims 27' fixed to this shaft and adapted to engage with gear 27 on adequate shifting of shaft 4 by means of forked arm 22 belonging to striker rod 16.

In both cases striker rods 16 and 18 are assumed to be situated one behind the other, as seen in the drawings, and adapted to be shifted independently from each other by means of lever 25.

If the gears with internal coupling teeth are constructed in the manner shown with gears 5, 6 and 7 of Fig. 1 so that they have two end rims of teeth, then it is possible to take them out of their bearings and reverse them so that the former right hand side becomes their left hand side and vice versa. This has the advantage that the coupling teeth are now worn on their other sides, respectively.

With the construction represented in the drawings it is also possible to interchange gear 5 with gear 6 and at the same time to interchange also gears 5' and 6'. Thus the sequence of the speeds attainable by operating lever 25 in the usual way becomes variable.

I do not want to be limited to the details described or shown in the drawings as many variations will occur to those skilled in the art.

What I claim is:

A four speed change speed gear comprising; a driving shaft and a driven shaft substantially in alignment with each other, a stub shaft substantially parallel to said first two shafts and adapted to be shifted in its longitudinal direction; a pair of gears rigidly connected to each other and splined to said stub shaft; a third gear in constant mesh with one of said pair of gears and in detachable connection with said driving shaft; a fourth gear in constant mesh with the other one of said pair of gears and in detachable connection with said driving shaft and with said driven shaft; shiftable members on said driven shaft and on said driving shaft and splined thereto, respectively, said members having outwardly extending teeth adapted to engage with inwardly extending teeth on said third and fourth gears; a fifth gear rigidly fixed to said driven shaft; a sixth gear rigidly fixed on said stub shaft and adapted on adequate shifting of said stub shaft to engage with said fifth gear; means for shifting said shiftable members on said driving and driven shaft, respectively; and means for shifting said stub shaft.

ALBERT MAIER.